(No Model.)
H. ROESKE.
FILTER.
No. 333,481. Patented Dec. 29, 1885.
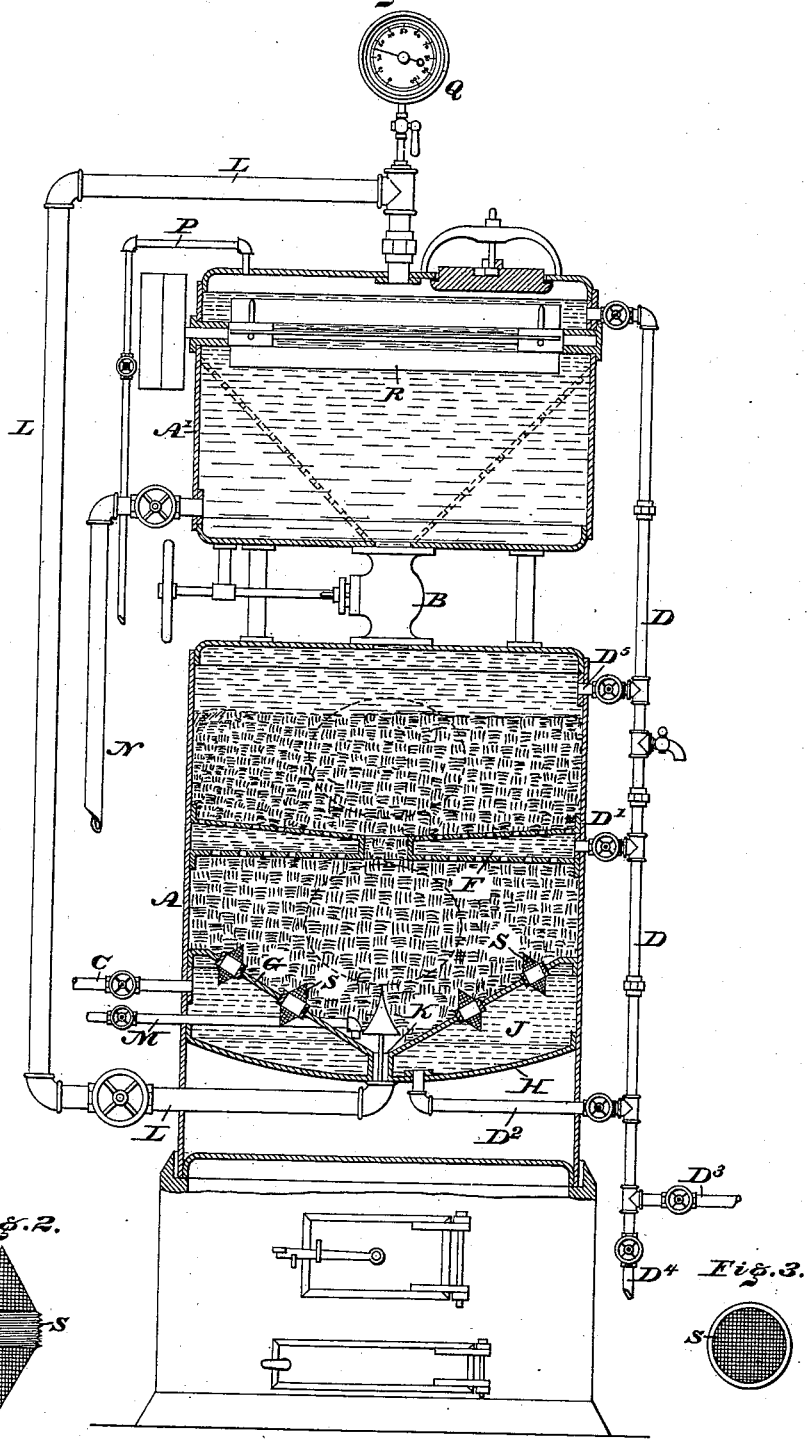
WITNESSES:
A. P. Grant
W. F. Kircher
INVENTOR:
Henry Roeske
BY John A. Wiedersheim
ATTORNEY.
N. PETERS. Photo-Lithographer, Washington, D. C.

UNITED STATES PATENT OFFICE.

HENRY ROESKE, OF PHILADELPHIA, PENNSYLVANIA, ASSIGNOR OF ONE-HALF TO MANOEL J. NASCIMENTO, OF SAME PLACE.

FILTER.

SPECIFICATION forming part of Letters Patent No. 333,481, dated December 29, 1885.

Application filed August 31, 1885. Serial No. 175,792. (No model.)

*To all whom it may concern:*

Be it known that I, HENRY ROESKE, a citizen of the United States, residing in the city and county of Philadelphia, State of Pennsylvania, have invented a new and useful Improvement in Filters, which improvement is fully set forth in the following specification and accompanying drawings, in which—

Figure 1 represents a central vertical section of a filter embodying my invention. Fig. 2 represents a side elevation of a detached part on an enlarged scale, and Fig. 3 represents an end view thereof.

Similar letters of reference indicate corresponding parts in the several figures.

My invention consists of a filter for water and other fluids, provided with means for properly filtering the fluid, drawing off the fluid at different stages of filtration, cleaning the filter, agitating and refreshing the filtering material, and discharging the impurities.

Referring to the drawings, A represents a cylindrical or other shaped vessel, which is supplied with filtering material and mounted on a furnace for heating the filter or fluid therein when so required, and A' represents a reservoir, which is supported above the vessel A and communicates therewith by means of a valve, B.

C represents an inlet-pipe, which leads into the vessel near the bottom thereof, and D represents a discharge-pipe, which leads from the reservoir A' and communicates with different apartments of the vessel A, as will be hereinafter more fully set forth. Within the vessel is secured a hollow diaphragm or chamber, F, and below the same a perforated diaphragm, G, which is of the form of an inverted cone and constitutes, with the bottom H of the vessel, a chamber, J, the center of the diaphragm having an opening, K, which communicates with a pipe, L, the latter also being in communication with the reservoir A'. The pipe D has a branch, D', which communicates with the chamber F, and a branch, D², which communicates with the chamber J, the top of said pipe and the branches having suitable cocks for opening and closing the communication of the pipe D with the reservoir A' and the respective chambers of the vessel A. The lower end of the pipe D has a branch, D³, for the passage of the filtered fluid to the place of service, and a branch, D⁴, for waste and cleansing purposes.

M represents a steam-pipe leading into the vessel A near the bottom thereof, or above the opening K of the diaphragm G, so as to be in communication with said opening. The reservoir A' is provided with a discharge-pipe, N, an air-supply pipe, P, and a pressure-gage, Q.

The operation is as follows: The water or fluid is supplied by the pipe C, and enters the chamber J and escapes through the diaphragm G into the filtering material in the vessel, and ascends to the top of the vessel, entering in its passage the chamber F, where the fluid, if drawn therefrom by the branch D', will be found to be partly filtered. The fluid may also be drawn from the top of the vessel A by means of a branch, D⁵. Should it be desired to draw unfiltered water from the chamber J, it is accomplished by the branch D². The filtered water rises to the elevated tank or reservoir A', from whence it may be withdrawn by the pipe D. Should it be desired to remove the entire contents of the reservoir A' or draw off the same rapidly, the cock of the pipe N is opened, as is also that of the pipe P, the latter admitting air to the reservoir. The filtering of the fluid admitted to the vessel by the pipe C continues, so that more fluid enters the reservoir A' and supplies the latter.

In order to cleanse the filter and freshen the filtering material, steam is admitted into the vessel A and ascends the same through the filtering material and passes through the valve B into the reservoir; or the steam may enter the pipe L, and thus reach the reservoir. In either case the filtering material is acted upon by the steam and loosened, and may be circulated with the steam and water through the filter. In all these manipulations the proper cocks are respectively opened and closed as may be required. When steam from the pipe M enters the vessel A, it circulates through the pipe L, the reservoir A', and the vessel A and its chambers, and carries the filtering material with it.

In order to remove the collected impurities, there is employed an agitator, R, which consists of a suitable number of paddles or blades mounted within the reservoir A' and having its shaft provided with a crank or pulley in order to be rotated, it being evident that the fluid and filtering material may be thoroughly agitated and the dirt or impurities separated therefrom. When the proper cocks are opened, the dirty or impure water may be discharged and the filtering material returned to its position in the vessel A.

In order to prevent the filtering material from entering the chamber J and chamber F, if desired, strainers S are employed, the same consisting of sacks or bags of gauze fabric, &c., attached to hollow plugs, which are screwed to the diaphragm G, it being seen that water and steam may readily pass through the strainers and the filtering material without allowing the passage of said material.

The reservoir A' may be placed in an upper floor of a building or elevated to any required extent, in which case a pipe of proper length is employed to connect said reservoir and the vessel A, the same being provided with a cock or valve, B, to open and close communication between said parts.

Having thus described my invention, what I claim as new, and desire to secure by Letters Patent, is—

1. A filter consisting of the tank A, having within the same hollow diaphragm F, forming chambers, the lowest chamber, J, being free from filtering material and having an inlet-pipe opening into the same, strainers covering the openings between the chambers J and the adjacent chamber containing filtering material, a steam-pipe opening into the filtering-chamber below the filtering material, and the reservoir A', placed above said tank A and having communication therewith both at bottom and top thereof, all of said parts being arranged and combined substantially as and for the purpose set forth.

2. The tank A, having a diaphragm provided with strainers S, consisting of sacks of gauze fabric attached to hollow screw-plugs, substantially as and for the purpose set forth.

HENRY ROESKE.

Witnesses:
JOHN A. WIEDERSHEIM,
JNO. K. PLITT.